Aug. 11, 1964   W. RAMSEIER ETAL   3,143,905
METAL CUTTING TOOL

Filed Nov. 17, 1960                    2 Sheets-Sheet 1

3,143,905
Patented Aug. 11, 1964

3,143,905
METAL CUTTING TOOL
Walter Ramseier and Pasquale Personeni, Schlieren, Switzerland, assignors to H. A. Schlatter Aktiengesellschaft, Zurich, Switzerland
Filed Nov. 17, 1960, Ser. No. 69,944
5 Claims. (Cl. 82—4)

The present invention relates to a tool for grinding or cutting tubular metal objects, and more particularly to a tool, preferably in the form of a pair of pliers, which is adapted to remove the excess metal or flash which remains after butt-welding two tubes or rods of approximately the same diameter.

It is common practice to weld tubes or rods by abutting to similar end portions and joining them by the application of heat and simultaneously pushing the abutting ends toward each other. When the heat fuses the metal, a portion thereof is pressed outwardly and forms a projection or flash around the circumference of the tube or rod after the welding operation has been completed.

Removing or trimming these projections by means of a lathe or other rotating device is sometimes a cumbersome procedure or even impossible, particularly when the area to be trimmed cannot be reached easily or when the work has to be done in close quarters or where obstructions of various kinds preclude easy access to the welded area. If a hand tool such as a file is used the trimming operations are slow and therefore costly and there is the danger that too much metal may be removed from the welded area which would necessarily weaken the welded joint and therefore any assembly of which it forms a part.

It is therefore an object of this invention to provide a tool for use in cutting or trimming the flash produced in butt-welding two similar tubes or rods, which tool is easy to handle and effective in operation.

It is another object of this invention to provide a tool for trimming the flash produced in butt-welding two tubes or rods, which tool is so designed that the trimming of the flash is confined to the diameter of the butt-welded tubes or rods so that a flash trim is obtained which does not weaken the welded joint.

It is a further object of this invention to provide a tool for trimming the flash produced in butt-welding two similar tubes or rods which tool is of simple construction and inexpensive to manufacture.

Other objects and advantages of the invention will be apparent from the following description and the drawings in which similar characters of reference indicate similar parts throughout the several views, and in which.

Figure 1:
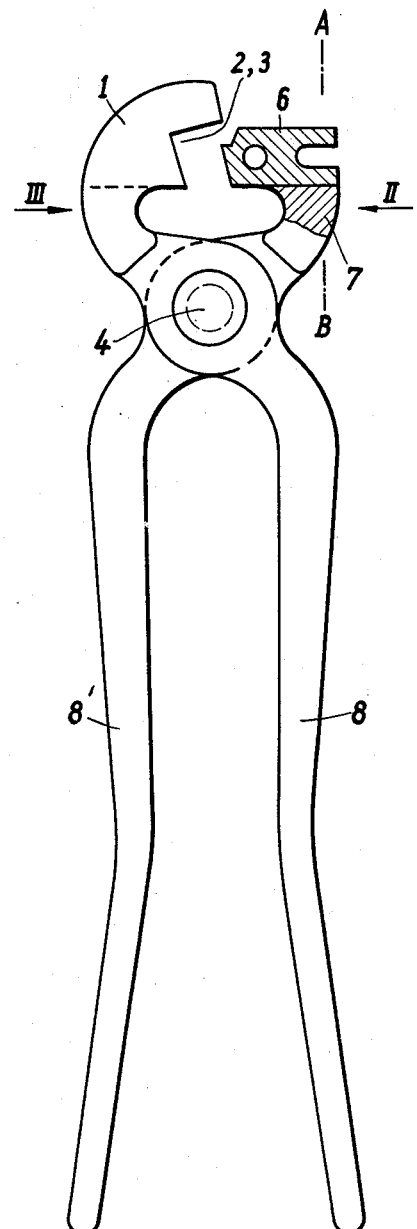
FIG. 1 is a plan view of a flash cutting tool embodying the present invention, with a portion of one of the jaws broken away and showing a cross-section through this jaw and an associated cutting knife.
Figure 2:
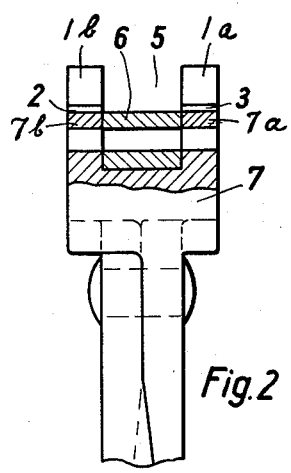
FIG. 2 is a fragmentary view in the direction of arrow II of FIG. 1, and partly in section along line A—B of FIG. 1.
Figure 3:
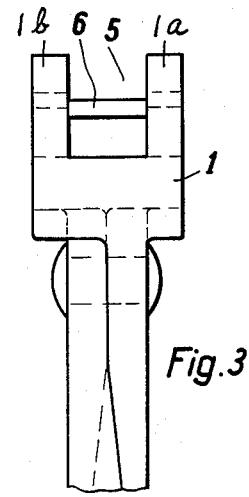
FIG. 3 is a fragmentary view in the direction of arrow III of FIG. 1.

Referring more particularly to FIG. 1 of the drawing there is shown a plier type cutting tool having a pair of handle members 8 and 8' which are pivotally joined to each other as by means of a pin 4. Each of the handles 8 and 8' has an integral formed jaw 1 and 7 respectively. Jaw 1 has a gripping portion which is cut in to form substantially a V-shaped recess. The gripping portion consists of two spaced walls 1a and 1b having aligned face portions 2 and 3 which are integral with the gripping portion and which grip or clamp the tubular bodies during the cutting operation. This gripping portion extends parallel to the axis of pin 4 and is provided on two spaced walls 1a and 1b forming therebetween a saddle of U-shaped cross-section as best shown in FIG. 3. A space 5 is thus provided between the walls 1a and 1b and between aligned face portions 2 and 3.

According to the invention the complementary jaw 7 of this plier type cutting tool is provided with spaced ridge portions 7a and 7b which are adapted to receive and hold a cutting knife blade 6 therebetween. Cutting blade 6 is releasably secured to ridge portions 7a and 7b by means of bolts or other suitable fastening means (not shown). Blade 6 extends between the ridge portions 7a and 7b opposite the space 5 formed between walls 1a and 1b of jaw 1. In order to facilitate the use of the cutting tool the handle members 8 and 8' are preferably bent outwardly by 8 to 12° at a point which is approximately ⅝ of their length away from the pivoting fork. This facilitates the handling of the trimming tool in removing the flash of tubular bodies of varying diameters.

In operation when the trimming tool is so placed that the gripping jaw and the cutter jaw engage the tubular body on opposite sides, it will be apparent from the foregoing description that each wall 1a and 1b engages an adjacent end of the butt-welded tubular bodies. The welding flash is received in this space between the walls of the gripping jaw and affords an easy unencumbered rotation of the trimming tool around the circumference of the tubular body. The face portions 2 and 3 of the walls 1a and 1b limit the removal of the metal in the welded area to the diameter of the adjacent ends of the welded tubular members.

Figure 4:
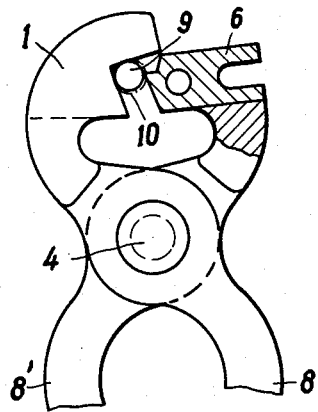
FIGS. 4, 5 and 6 are fragmentary plan views of the cutting tool head partly broken away and in section each showing a tubular member of different diameter located between the jaws of the cutting tool.
Figure 5:
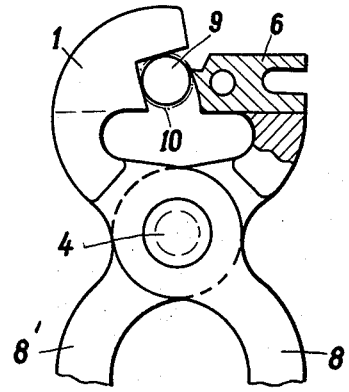
Figure 6:
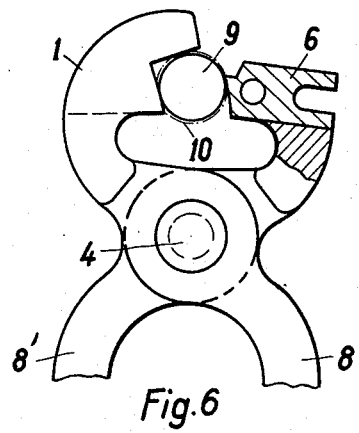

Referring more particularly to FIGURES 4 through 6, the jaw members of the plier-type cutting tool are shown with three tubular members having different diameters gripped between the jaws prior to removing the welding flash indicated by numeral 10. As illustrated in these figures the edge of the cutting blade contacts the welding flash of the tubular bodies at substantially the same circumferential point although there is a considerable variance in the diameters of these tubular bodies. This point or contact angle is determined by the shape or angle of the face portions and the distance of these face portions and of the cutting edge of the cutting blade from the axis of pivot pin 4. By changing the configuration of the face portions 2 and 3 into a curved shape it is possible to obtain a contact angle which remains constant within a wider range.

Figure 7:
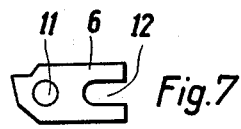
FIG. 7 is a plan view of a cutting knife.
Figure 8:
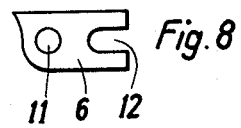
FIG. 8 is a plan view of a cutting knife having a face portion which is modified with regard to the face portion of the cutting knife of FIG. 7.

Referring now to FIGURES 7 and 8 there are shown two embodiments of the cutter blade having different face configurations. The cutter blades have a bore 11 and a longitudinal slot 12, a pin, bolt, screw or a similar member (not shown) being passed through slot 12 in order to secure the cutter blade to the ridge portions 7a and 7b of jaws 7. The cutter blade or knife may be arranged on the ridge portions of jaw 7 in a manner so as to be slidable as well as tiltable thereon to permit adjustment of the knife relative to the ridge portions. In this manner the knife may be adjusted to provide the proper cutting position relative to the tubular members depending upon their diameter. As the diameter of the tubular body to be worked varies it is thus possible to select or substitute a cutting knife having a suitable face configuration.

In the example shown the cutting knife has a cutting edge which extends parallel to the gripping faces 2 and 3 and parallel to the axis of the tubular body to be worked on. In place of a single blade several blades may be employed which may, if desired, be inclined alternately in the opposite direction toward the axis of the tubular member.

In order to make sure that the cutter blade is effective only to remove the welding flash and not additionally adjacent portions of the tubular members the movement of the cutter blade toward the tubular member may be limited by providing for instance a screw member which may be threaded into one of the handles 8 or 8' and which is adapted to strike against the other handle member in a selected end position of the cutter blade. The position of this adjusting screw may be fixed by means of a second screw element which may be threaded against the shank of the adjusting screw. Other arrangements for providing a fixed adjustment of such a screw member are readily apparent to a person skilled in the art.

An adjustment of the cutter blades is not necessary when removing the welding flash of tubular members having diameters which vary within a larger diameter range provided the position of the pivot pin may be adjusted with reference to one or both jaws. If the cutting tool is designed as parallel pliers the contact angle of the cutter blade becomes substantially independent of the diameter of the tubular member to be cut.

While certain specific embodiments of the present invention have been shown and described it will be readily understood by those skilled in the art that the invention is not limited exactly thereto, since various modifications may be made without departing from the scope of the invention as defined in the appended claims.

What is claimed is:

1. A tool for trimming the flash of cylindrical work pieces consisting of a first handle member, a gripping jaw on said first handle member, said gripping jaw having spaced walls defining a recess therebetween, said walls having substantially V-shaped gripping surfaces, a second handle member, pivot means for pivotally connecting said first and second handle members to each other, a cutting jaw on said second handle member confronting said gripping jaw, and cutting means on said cutting jaw adjustable relative to said aligned gripping surfaces, said cutting means having a cutting surface disposed substantially parallel to the opposed gripping surfaces and confronting said recess.

2. A tool for trimming the flash of cylindrical work pieces consisting of a first handle member, a gripping jaw on said first handle member, said gripping jaw having spaced side walls defining a recess for receiving the flash of a cylindrical work piece therebetween, said spaced side walls having substantially V-shaped gripping surfaces, a second handle member, pivot means for pivotally connecting said first and second handle members, a cutting jaw on said second handle member confronting said gripping jaw, spaced aligned ridge portions on said cutting jaw disposed opposite said gripping surfaces, and cutting means mounted on said ridge portions and confronting said recess substantially parallel to the opposed gripping surfaces.

3. A tool for trimming the flash of cylindrical work pieces consisting of a first handle member, a gripping jaw on said first handle member, said gripping jaw having spaced side walls defining a recess therebetween, said spaced side walls having substantially V-shaped gripping surfaces, a second handle member, longitudinal pivot means for pivotally connecting said first and second handle members to each other, said gripping surfaces being axially spaced and aligned relative to said longitudinal pivot means, a cutting jaw on said second handle member confronting said gripping jaw, raised blade support means on said cutting jaw disposed opposite said gripping surfaces, at least one blade means adjustably mounted between said blade support means, the cutting edge of said blade means extending opposite said recess along at least a portion of its length and parallel to said longitudinal pivot means.

4. A tool for trimming the flash of cylindrical work pieces consisting of
a first handle member,
a gripping jaw on said first handle member,
a second handle member,
a cutting jaw on said second handle member and confronting said gripping jaw,
pivot means for pivotally connecting said first and second handle members,
said gripping jaw having spaced walls defining a recess therebetween,
said spaced walls having aligned, substantially V-shaped gripping surfaces,
said cutting jaw having cutting means confronting said recess and a cutting surface disposed substantially parallel to the opposed aligned gripping surfaces.

5. The cutting tool according to claim 4 wherein said cutting means extends between said spaced walls.

References Cited in the file of this patent

UNITED STATES PATENTS

| | | |
|---|---|---|
| 124,654 | Anderson | Mar. 19, 1872 |
| 943,382 | Broadbooks | Dec. 14, 1909 |
| 1,011,157 | Chytraus | Dec. 12, 1911 |
| 2,061,718 | Stahl | Nov. 24, 1936 |
| 2,064,661 | Hammond | Dec. 15, 1936 |
| 2,309,218 | Schwinn | Jan. 26, 1943 |
| 2,695,542 | Ward | Nov. 30, 1954 |

FOREIGN PATENTS

| | | |
|---|---|---|
| 1,127,612 | France | Aug. 13, 1956 |